United States Patent [19]
Wilson

[11] Patent Number: 5,995,854
[45] Date of Patent: *Nov. 30, 1999

[54] ACCESSORY FOR A MOBILE COMMUNICATION DEVICE

[75] Inventor: L. R. Wilson, London, United Kingdom

[73] Assignee: Leslie R. Wilson, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/513,951
[22] PCT Filed: Mar. 10, 1994
[86] PCT No.: PCT/GB94/00470
  § 371 Date: Nov. 6, 1995
  § 102(e) Date: Nov. 6, 1995
[87] PCT Pub. No.: WO94/21054
  PCT Pub. Date: Sep. 15, 1994

[30] Foreign Application Priority Data

Mar. 11, 1993 [GB] United Kingdom .................. 9304980

[51] Int. Cl.⁶ .................................................. H04B 01/08
[52] U.S. Cl. ........................... 455/575; 455/90; 455/117; 455/128; 343/702
[58] Field of Search ............................... 455/89, 90, 117, 455/128, 347, 550, 575; 343/702; 379/58, 59, 437, 442, 451, 452; 348/818, 819; 437/176; 361/816

[56] References Cited

U.S. PATENT DOCUMENTS

| | | | |
|---|---|---|---|
| 4,699,804 | 10/1987 | Miyata et al. | 437/176 |
| 4,771,927 | 9/1988 | Ventura | 455/90 X |
| 4,874,903 | 10/1989 | Clarke | 348/818 X |
| 5,265,273 | 11/1993 | Goodwin et al. | 455/90 X |
| 5,335,366 | 8/1994 | Daniels | 455/90 X |
| 5,336,896 | 8/1994 | Katz | 455/90 X |
| 5,338,896 | 8/1994 | Danforth | 455/90 X |
| 5,367,309 | 11/1994 | Tashijian | 455/90 X |
| 5,410,372 | 4/1995 | Lee | 348/818 |
| 5,444,866 | 8/1995 | Cykievt | 455/90 X |
| 5,535,439 | 7/1996 | Katz | 455/90 X |
| 5,550,552 | 8/1996 | Oxley | 455/90 X |

Primary Examiner—Wellington Chin
Assistant Examiner—Philip J. Sobutka
Attorney, Agent, or Firm—Westman, Champlin & Kelly, P.A.

[57] ABSTRACT

An accessory for a mobile communication device such as a mobile telephone (1) comprises a shield (12) adapted to provide an attenuating effect to radiation from the mobile communication device (1), and means (11) to mount the shield on the device so that, in use, the shield is located between the antenna on the device and a person using the device. The shield (12) may form part of a case (11) for a communication device such as a mobile telephone.

18 Claims, 3 Drawing Sheets

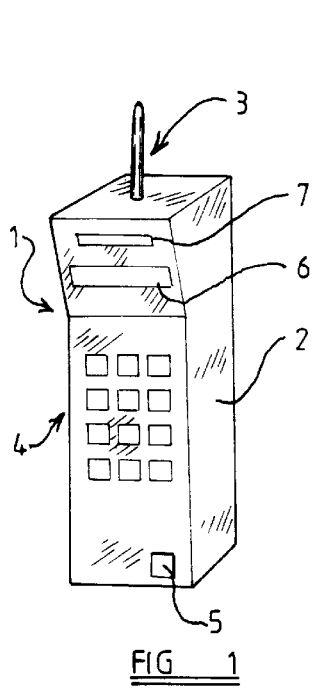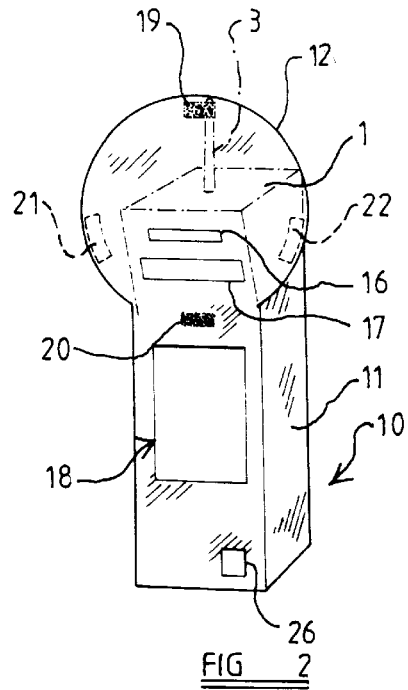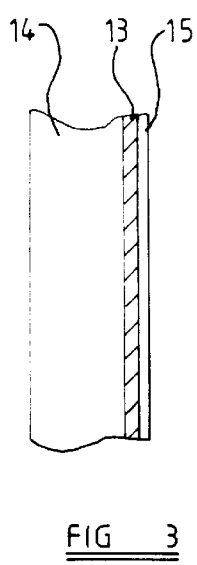
FIG 1  FIG 2  FIG 3
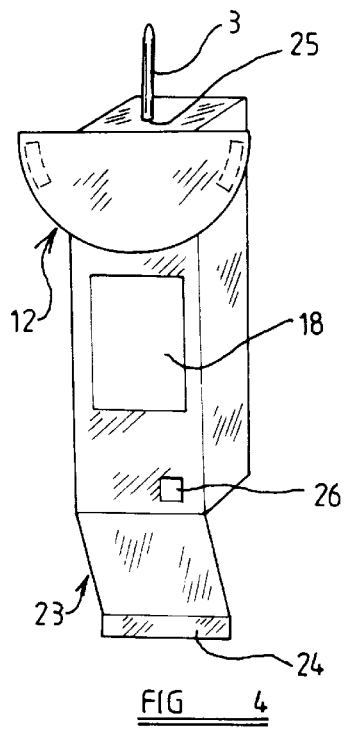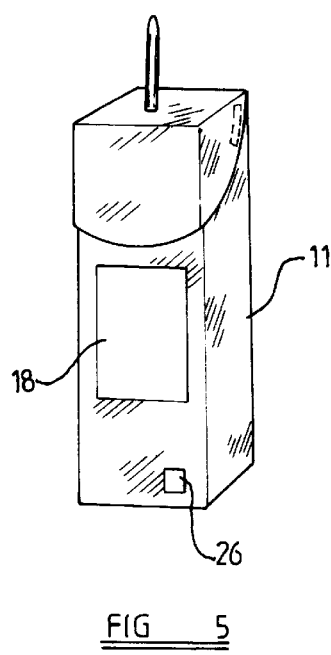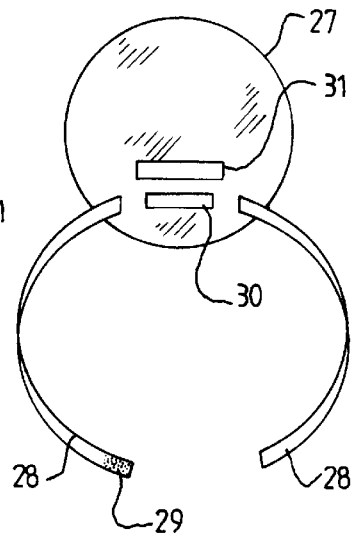
FIG 4  FIG 5  FIG 6

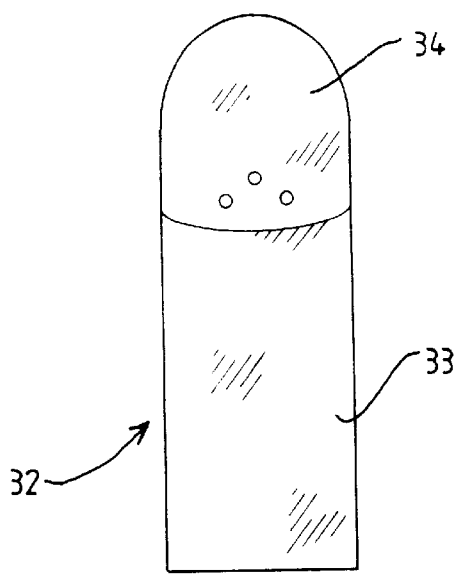
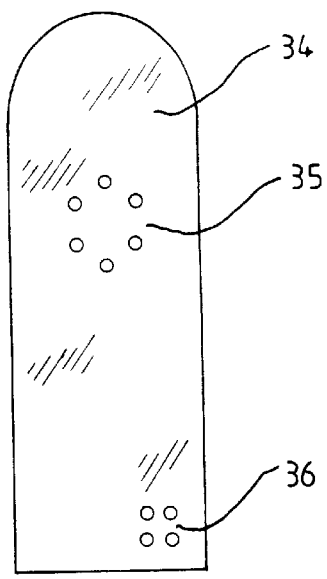
FIG 7
FIG 8
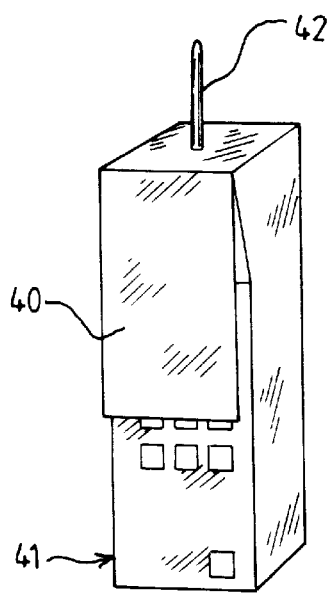
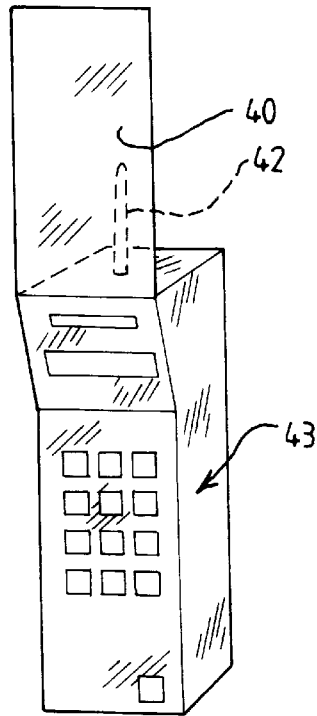
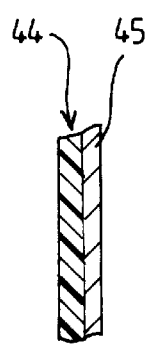
FIG 9
FIG 10
FIG 11

ACCESSORY FOR A MOBILE COMMUNICATION DEVICE

THE PRESENT INVENTION relates to an accessory for a mobile communication device such as a mobile telephone, or a pager.

Mobile telephones and pagers are becoming more commonly used, but concern has been expressed about the possible dangers that may arise from using such devices. A mobile telephone is provided with a protruding antenna mounted on the body of the telephone, which radiates relatively high power radiation when the telephone is in use. It has also been found that the body of the telephone radiates power when the telephone is in use. When the telephone is in use the telephone is held with the body of the telephone adjacent the ear of the person using the telephone. When in this position the antenna is located immediately adjacent the side of the head of the person using the telephone. It has been suggested that this radiation may cause brain tumours or other brain disorders.

It is believed that other mobile communication devices, such as pagers, also radiate radiation, when in use, which is a potential health hazard.

The present invention seeks to provide an accessory for a mobile communication device which will make the mobile communication device safer to use. The accessory may be supplied separately for use with an existing communication device, or may be formed integrally with the communication device.

According to this invention there is provided an accessory for a mobile communication device having an antenna, said accessory comprising a shield adapted to provide an attenuating effect to radiation from the antenna of the device, and means to mount the shield on the device so that, in use, the shield is located between the antenna on the device and a person using the device.

It is envisaged that when the accessory is in use the shield, since it is located between the antenna on the device and the person using the device, and since it provides an attenuating effect on radiation from the antenna, will serve to significantly reduce the amount of radiation impinging on the person using the device.

It is believed that this expedient will serve to obviate, or at least reduce the risk of the radiation causing brain tumours or other brain disorders, or other medical conditions.

Preferably the shield incorporates an electrically conducting layer, such as a metallic foil, which may preferably be perforated to form a micro-screen, to attenuate the radiation from the antenna. Alternatively, the conductive layer may be a metallic scrim. Preferably the shield is in the form of a laminate.

The shield may be formed integrally with the device, or the shield may form an integral part of a case for the device, the case comprising the means to mount the shield in position on the device.

Advantageously the case is formed of a laminate including an electrically conducting layer to provide the shielding effect.

Conveniently the electrically conducting layer in the case comprises a micro-screen.

Preferably the shield is movable from an operative position to a collapsed position.

Conveniently the shield is adapted to be moved to the collapsed position by folding the shield about a substantially central line and then folding back two protruding portions of the shield.

Preferably the shield is provided with elements of hook and/or loop material to retain the shield in the collapsed condition.

In a further embodiment the shield is provided with means to fasten or secure the shield to the device.

Conveniently a region of the shield intended to be adjacent the ear-piece of the telephone is such that sound waves may pass through the shield in that region.

Preferably the shield incorporates an electrically conducting micro-screen, the micro-screen being exposed in that region so that sound waves may pass through the apertures in the micro-screen.

The invention also relates to a mobile communication device in combination with an accessory as described.

According to another aspect of this invention there is provided an accessory for a mobile telephone having an antenna, said accessory comprising a shield adapted to provide an attenuating effect to radiation from the antenna of the telephone, and means to mount the shield on the telephone so that, in use, the shield is located between the antenna on the telephone and the head of a person using the telephone.

According to another aspect of this invention there is provided an accessory for a mobile communication device, said accessory comprising shielding means to be located between a radiation generating part of the device and a person using the device.

In yet a further aspect this invention provides an accessory for a mobile communication device, said accessory comprising a casing to receive the housing of the communication device, the casing incorporating a shield to provide an attenuating effect to radiation emanating from the housing of the device, the arrangement being such that, in use, the shield is located between the device and a person using the device.

In order that the invention may be more readily understood, and so that further features thereof may be appreciated, the invention will now be described, by way of example, with reference to the accompanying drawings in which:

FIG. 1 is a perspective view of a typical mobile telephone, which comprises an example of a mobile communication device, FIG. 2 is a view of a casing containing the mobile telephone of FIG. 1, the casing being provided with an integral shield, the shield being illustrated in the erect condition, FIG. 3 is a cross-sectional view of part of the material forming the casing, FIG. 4 shows the casing of FIG. 2 with the shield in a partially collapsed condition, also showing a closure flap for the casing in an open position, FIG. 5 corresponds to FIG. 4 and shows the closure flap in the closed condition and the shield in the fully collapsed condition, FIG. 6 is a perspective view of a shield adapted to be strapped to a mobile telephone.

FIG. 7 is the front view of a pouch adapted to receive a mobile telephone,

FIG. 8 is a rear view of the pouch of FIG. 7,

FIG. 9 is a perspective view of a mobile telephone with an integral shield,

FIG. 10 is a perspective view of the telephone of FIG. 10 with the shield in the operational position, FIG. 11 is a sectional view through part of the housing of the telephone of FIGS. 9 and 10.

Figure 12:
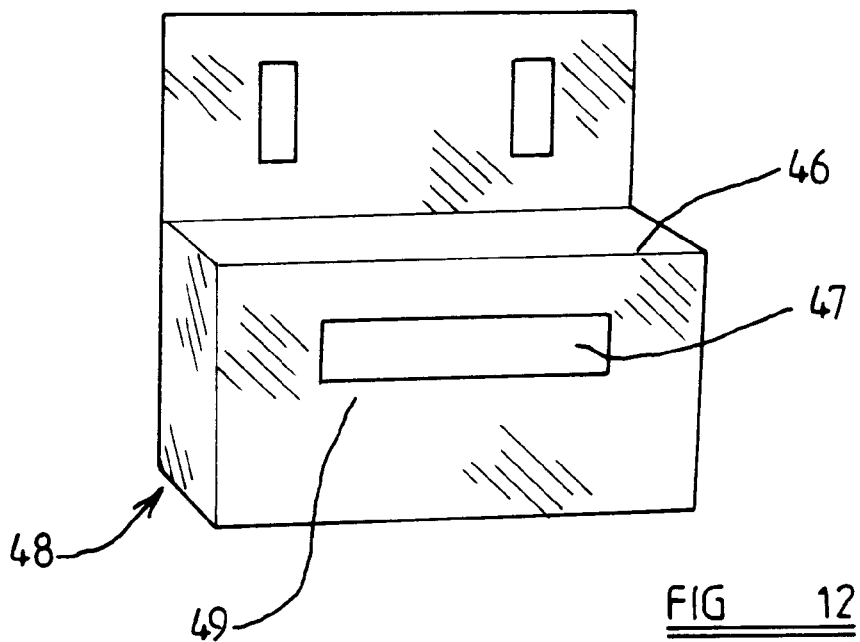
FIG. 12 is a perspective view of a pager with an integral shield.

Referring to FIG. 1 a mobile telephone 1 is illustrated diagrammatically. Many different designs of mobile telephone are available, but the features of such mobile telephones are broadly similar. The mobile telephone 1 comprises a rigid elongate housing 2. Provided at one end of the housing 2 is an axially extending aerial or antenna 3. Provided on one face of the housing 2 is a key-pad 4, and located adjacent the key-pad is an opening in the housing providing communication with a microphone 5. Located above the key-pad 4 is a display screen 6 and an opening 7 providing communication with an ear-piece.

When the telephone of FIG. 1 is in use the housing 2 is held adjacent the head of a person using the telephone with the opening 7 adjacent the ear and the opening 5 in the region of the mouth. It can be seen that when in this position, the antenna 3 is located at a position adjacent and immediately above the ear of the person using the telephone. The antenna emits intense radiation at a relatively high power level. The main body of the telephone also emits radiation. It is thought that this radiation, so close to the brain, may give rise to brain tumours or the like.

FIG. 2 illustrates the telephone 1 of FIG. 1 present within a casing, the casing incorporating an integral shield. The top part of the telephone 1 is visible in phantom in FIG. 2.

The casing 10 comprises a main portion 11 dimensioned snugly to receive the housing 2 of the telephone 1. Integrally formed with the casing 11 is a shield 12 which, in the illustrated embodiment, is of circular shape, but which may have any appropriate shape. The shield 12 is such that the lower part of the shield is located in the region of the opening 7 leading to the ear-piece and the display screen 6, but the upper part of the shield projects above the top of the housing 2 of the telephone 1, the top of the shield thus being located between the antenna 3 and the head of a person using the telephone when the telephone is in use.

The shield 12 may have any appropriate form, but provides an attenuation effect on the radiation from the antenna 3, thus minimising the radiation impinging on the head of the person using the telephone. The shield is preferably formed of a laminated construction, as shown in FIG. 3. One layer of the laminate comprises a conductive layer 13 which provides the shielding effect. The conductive layer may comprise a metal foil, but preferably the metal foil is perforated to form a micro-screen. Other forms of conductive layer, such as a woven scrim or a metal net may be used. Another layer of the laminate, layer 14, may form the exterior of the case. The layer 14 may comprise leather or a plastic material. The laminate also comprises, in this embodiment, an inner plastics material layer 15. One or both of the layers 14 and 15 may be padded.

The apertures in the micro-screen, scrim or net are of such a size that they do not allow radiation from the antenna to pass. However, the apertures permit sound waves to pass and also permit light to pass.

It is to be observed that an opening 16 is provided in the lower part of the shield in a position adjacent the opening 7 leading to the ear-piece. If the conductive layer is a micro-screen or scrim, the opening 16 may be an opening formed only in the outer and inner layers 14,15 of the laminate, such as to expose the micro-screen or scrim 1,13 thus enabling sound waves from the ear-piece to pass through the shield, the sound waves passing through the apertures in the micro-screen. Thus, the shield is not interrupted in the region of the opening 15.

The outer layer 14 and inner layer 15 of the laminate forming the case are provided with an opening 17 located adjacent the display screen 6. This opening is such as to render the display screen visible through the conductive layer 13. If the conducting layer 13 is a micro-screen, the size of the apertures in this region of the micro-screen may be increased slightly so that the micro-screen is still present, but items displayed on the display screen 6 are visible from the exterior of the telephone through the micro-screen.

It is preferred that the conductive layer 13 comprising the screening material extends over the whole of the casing 11. Thus, the entire case 11 and the shield 12 may be formed of a laminate as described. The case will then, when the shield 12 is erected, shield radiation from the antenna and from the body of the telephone. Experiments have shown that a case and shield as described may reduce the radiation from a mobile telephone in the region occupied by the head of a person using the telephone by more than 97%.

A region 18 of the casing 11 which is co-aligned with the key-pad 4 when the telephone is in position within the casing may be made to be transparent, so that the key-pad can be observed. In one embodiment in the region 18 an aperture is formed in the inner and outer layers 14,15 of the laminate, the conductive layer in this region being transparent. Alternatively, this region may be provided with printing or other indicia showing the positions of the various keys of the key-pad beneath that part of the casing. If the material forming the casing is sufficiently flexible, the key-pad may be operated satisfactorily simply by applying pressure to the exterior of the casing.

The shield 12 is provided, on its front face at diametrically opposed position, with pads 19,20 of hook and loop material such as that sold under the Registered Trade Mark VELCRO. Similarly the rear face of the shield is provided with similar pads of hook and loop material 21,22. When the shield is to be collapsed, when the telephone is not in use, initially the top part of the shield is folded downwardly about a diametrically extending line, thus bringing the upper pad 19 and the lower pad 20 of hook and loop material into contact, so that the pads engage with each other and retain the shield in the partially folded condition. This is the condition of the shield 12 illustrated in FIG. 4. The two parts of the shield which then project to either side of the main part of the casing are then folded back, to have the position illustrated in FIG. 5, and the pads 21,22 of the hook and loop material engage with co-operating pads provided on the sides of the main part of the casing 11.

FIG. 3 illustrates a closure flap 23 provided at the bottom of the casing which can be opened to permit the telephone 1 to be inserted into the casing and which can then be closed. The closure flap 23 may be provided with a terminal lip 24 carrying a pad of hook and loop material (such as that sold under the Registered Trade Mark VELCRO) to engage with a co-operating pad provided in the body of the casing. It is to be appreciated that in a modified embodiment the closure flap 23 may be provided at the top of the casing rather than at the bottom of the casing. The casing defines an aperture 25 at the top of the main part of the casing adjacent the shield. The antenna 3 may pass through the aperture 25.

The inner and outer layers 14,15 of the laminate are apertured in the region 26, which is substantially aligned with the microphone 5 when the telephone 1 is in the casing 10.

It is to be appreciated that the casing, as described, totally surrounds the telephone 1, with the antenna 3 of the telephone protruding from the casing through the aperture 25, as can be seen in FIG. 3 and 4. If the entire casing is provided with the electrically conductive shielding layer, it is believed that the amount of radiation directed from the telephone towards a person using the telephone will be minimised.

Because the antenna is not completely surrounded by the shield, the antenna can still successfully transmit and receive signals, so the performance of the telephone is not impaired.

Whilst the invention has thus far been described as an accessory for a mobile telephone in the form of a casing provided with an integral shield, it is to be understood that the invention also embraces a separate shield which may be clipped or otherwise secured to the telephone before the telephone is used. Thus, the casing of the described embodiment can be considered simply as means for mounting a shield on a telephone, but other means may be used for mounting the shield in position.

Referring to FIG. 6 a shield 27 of circular form, of metal or of a plastic and metal laminate, is adapted to be strapped to the housing 2 of a telephone such as that shown in FIG. 1 by means of straps 28 which each have one end attached to the shield 27, and which carry, at their free ends, interengageable pads 29 of hook and loop material such as that sold under the Registered Trade Mark VELCRO. The shield has apertures 30,31 formed therein to be aligned with the display screen 6 and the ear-piece opening 7 of the telephone 1 when the straps 28 have been used to correct the shield 27 to the housing 2 of the telephone in a position corresponding to that of the shield 12, with the shield 26 located between the antenna 3 and the head of a person using the telephone.

FIG. 7 illustrates an alternate form of casing 32 for use with a mobile telephone. The casing 32 comprises a pouch 33 formed of a laminate incorporating an electrically conductive shielding layer, such as that described above with reference to FIG. 3.

One side of the pouch extends upwards above the mouth of the pouch to form a projecting tab 34 which comprises a shield. The side of the pouch provided with the protruding tab 34 is also provided with two areas 35,36, provided with apertures through at least the outer and inner layers of the laminate forming the pouch. The area 35 is substantially aligned with the ear-piece opening present in the housing of a conventional portable telephone and the region 36 is aligned with the microphone opening of a conventional telephone when the telephone is inserted in the pouch.

The tab 34 comprises a shield located between the antenna of the telephone and the head of a person using the telephone. The main body of the pouch 33 provides a shielding effect for the main housing of the telephone.

The pouch 33 may be provided with regions corresponding to the regions 18 and 26 in which the inner and outer layers of the laminate are apertures to leave just a microscreen covering the key-pad and microphone of the telephone.

In the embodiments described above, the shield is provided as an accessory which can be utilised with a pre-existing telephone. If reference is made to FIGS. 9 to 11 in another embodiment of the invention a shield 40 is provided which is provided integrally with a telephone 41. The shield may be moved in a hinging or pivotal manner from a retracted position as shown in FIG. 9 to an elevated or operational position as shown in FIG. 10, the shield 40 then being located between the antenna 42 of the telephone 41 and the head of a person using a telephone. The housing 43 may be made of a laminate comprising an outer layer of rigid plastic material 44 and an inner conductive coating or metal layer 45, as shown in FIG. 11. The inner conductive layer 45 will provide a shielding effect for radiation emanating from the main housing 43 of the telephone.

Whilst in the embodiments described above, reference has been made to a mobile communication device in the form of a mobile telephone, the invention may find an application for use with mobile communications devices such as a mobile pager.

Figure 13:
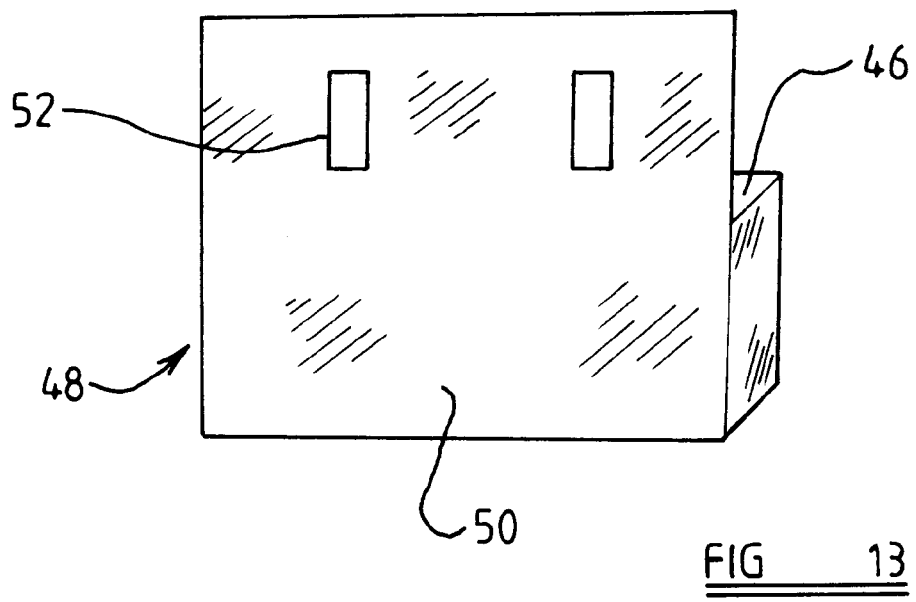
FIG. 13 is a perspective view of the pager of FIG. 12 with the shield in the operative position.

FIGS. 12 and 13 illustrate a mobile pager 46, which comprises a rectangular housing with a display screen 47. The paper has an antenna which is completely within the housing and thus not visible. The pager 46 is contained within a casing 48, made of a laminate as described above with reference to FIG. 3. The casing 48 covers the front of the pager 46, but the inner and outer layers of the laminate (and optionally the metallic layer of the laminate also) are apertured in the region 49 so that the display screen 47 is visible. The casing covers the sides and back of the pager 46, and the part of the casing 50 that covers the back of the pager extends above the top of the pager to form a flap 51 provided with apertures 52 through which a belt may be threaded. The housing does not cover the top of the pager, which is exposed, so that the antenna within the pager is not totally shielded.

If the pager is carried on a belt threaded through the apertures 51 the rear part 50 of the casing and the flap 51 are located between the pager and the person wearing the pager thus providing a shielding effect. Thus, the person using the pager is shielded from radiation from the antenna of the pager and any radiation emanating from the housing of the pager.

It is to be understood that in a modified embodiment of the invention the housing of the pager could be made from a laminate as described with reference to FIG. 11, to provide a similar shielding effect.

It is to be appreciated, therefore, that in the described embodiments of the invention, shielding means are provided which, in use, are located between the antenna of the mobile communication equipment, or between the mobile communication equipment itself, and a person using that mobile communication equipment. The shielding means, however, does not shield the antenna entirely from the ether, so that the antenna can operate to receive and transmit signals in a satisfactory manner.

Whilst the invention has been described with reference to various embodiments, it is to be appreciated that many modifications may be effected without departing from the spirit and scope of the invention.

What is claimed is:

1. An accessory for a mobile communication device, said accessory comprising a casing to receive the housing of the communication device, the casing incorporating a shield to provide an attenuating effect to radiation emanating from the housing of the device, at least part of the shield being movable from an operative position to a collapsed position, said part of the shield being connected to the casing by means of a central fold-line or hinging line so that said part of the shield can be moved to the collapsed position by folding the shield about the said line, and then folding back to protruding portions of the said part of the shield, the arrangement being such that, in use, said at least part of the shield may be located between the device and a person using the device.

2. An accessory according to claim 1 wherein the case incorporates an electrically conducting layer to attenuate the radiation from the device.

3. An accessory according to claim 2 wherein the case is formed of a laminate including said electrically conducting layer.

4. An accessory according to claim 2 wherein the electrically conducting layer is in the form of a metallic foil.

5. An accessory according to claim 4 wherein the metallic foil is perforated to form a micro-screen.

6. An accessory according to claim 2 wherein the conductive layer is metallic scrim.

7. An accessory according to claim 1 wherein the said part of the shield is provided with elements of hook and loop material to retain the said part of the shield in the collapsed condition.

8. An accessory according to claim 1 wherein the said communication device is a mobile telephone and a region of the shield intended to be adjacent the ear-piece of the telephone is such that sound waves may pass through the shield in that region.

9. An accessory according to claim 8 wherein the shield incorporates an electrically conducting micro-screen, the micro-screen being exposed in the said region so that sound waves may pass through the apertures in the micro-screen.

10. An accessory according to claim 1 wherein said part of the shield is movable from an operative position to a collapsed position.

11. An accessory according to claim 2 wherein the said part of the shield is adapted to be moved to the collapsed position by folding the shield about a substantially central line and then folding back two protruding portions of the said part of the shield.

12. An accessory according to claim 10 wherein the said part of the shield is provided with elements of hook and loop material to retain the said part of the shield in the collapsed condition.

13. A mobile communication device having a housing, the housing incorporating a flexible shield adapted to cover a keypad of the communication device and allow operation therethrough to provide an attenuating effect to radiation emanating from the device, at least part of the flexible shield being connected to the housing by means of a fold-line or hinging line, so that part of the shield can be folded about the said line, the arrangement being such that, in use, said at least part of the shield may be located between the device and a person using the device.

14. An accessory according to claim 13 wherein the case incorporates an electrically conducting layer to attenuate the radiation from the device.

15. An accessory according to claim 14 wherein the case is formed of a laminate including said electrically conducting layer.

16. An accessory according to claim 14 wherein the electrically conducting layer is in the form of a metallic foil.

17. An accessory according to claim 16 wherein the metallic foil is perforated to form a micro-screen.

18. An accessory according to claim 16 wherein the conductive layer is metallic scrim.

* * * * *

UNITED STATES PATENT AND TRADEMARK OFFICE
CERTIFICATE OF CORRECTION

PATENT NO. : 5,995,854
DATED : November 30, 1999
INVENTOR(S) : L.R. Wilson

It is certified that error appears in the above-identified patent and that said Letters Patent is hereby corrected as shown below:

On the title page,

Under [56] U.S. PATENT DOCUMENTS, insert --

5,178,722     1/1993    Hoshino.......156/630--

Under FOREIGN PATENT DOCUMENTS, insert --

2,022,958    8/1990     Canada
   4220851      8/1992     Japan
   3238936      10/1991    Japan
   0 348 187 A2  12/1989    Europe --

Signed and Sealed this

Fourteenth Day of November, 2000

Attest:

Q. TODD DICKINSON

*Attesting Officer*           *Director of Patents and Trademarks*